United States Patent
Koenig et al.

(10) Patent No.: US 6,957,602 B1
(45) Date of Patent: Oct. 25, 2005

(54) PARACHUTE ACTIVE PROTECTION APPARATUS

(75) Inventors: Walter H. Koenig, Lafayette, NJ (US); Gregory Malejko, Hackettstown, NJ (US); John C. Grau, Sussex, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/904,089

(22) Filed: Oct. 22, 2004

Related U.S. Application Data

(60) Provisional application No. 60/521,453, filed on Apr. 28, 2004.

(51) Int. Cl.[7] .................................... B64D 1/04
(52) U.S. Cl. .................. 89/1.11; 89/36.16; 102/502
(58) Field of Search ................... 89/1.11, 36.16, 89/1.1; 244/142; 102/374, 502

(56) References Cited

U.S. PATENT DOCUMENTS

| | | | | |
|---|---|---|---|---|
| 3,593,664 A | * | 7/1971 | Davis et al. | 102/337 |
| 4,912,869 A | * | 4/1990 | Govett | 42/105 |
| 5,069,109 A | * | 12/1991 | Lavan, Jr. | 89/1.11 |
| 5,583,311 A | * | 12/1996 | Rieger | 89/1.11 |
| 6,231,002 B1 | * | 5/2001 | Hibma et al. | 244/3.22 |
| 6,626,077 B1 | * | 9/2003 | Gilbert | 89/1.11 |
| 6,904,838 B1 | * | 6/2005 | Dindl | 89/1.1 |

* cited by examiner

*Primary Examiner*—J. Woodrow Eldred
(74) *Attorney, Agent, or Firm*—John F. Moran

(57) ABSTRACT

An apparatus for protecting an object from an incoming munition includes a tracking apparatus mounted on the object, for tracking the incoming munition; a firing solution computer connected to the tracking apparatus; a plurality of launch tubes mounted on the object, the plurality of launch tubes pointing in different directions so as to maximize coverage of an area surrounding the object; a parachute container attached to each launch tube; an igniter disposed in a rear of each launch tube and connected to the firing solution computer; a propelling charge disposed in front of each igniter; a mass disposed in front of each propelling charge; a connecting ring attached to a front of each mass; a parachute disposed in the parachute container; and a cable connecting the connecting ring and the parachute.

12 Claims, 2 Drawing Sheets

PARACHUTE ACTIVE PROTECTION APPARATUS

CROSS REFERENCE TO RELATED APPLICATIONS

Figure 1:
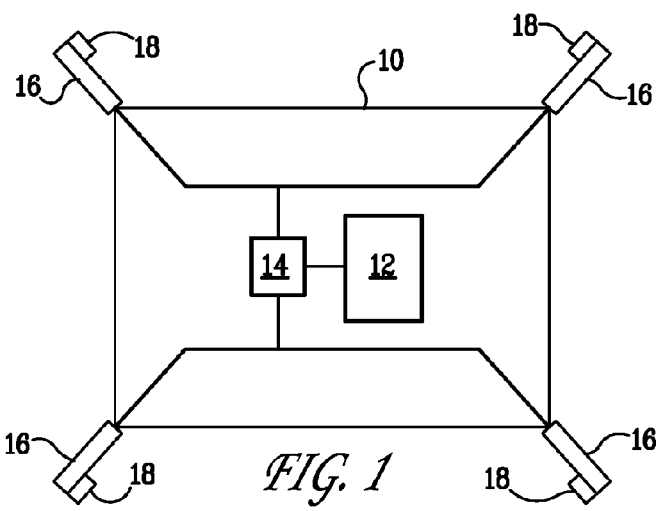

This application claims benefit under 35 USC 199(e) of provisional application 60/521,453, filed Apr. 28, 2004, the entire file wrapper contents of which provisional application are herein incorporated by reference as though fully set forth at length.

STATEMENT OF GOVERNMENT INTEREST

The inventions described herein may be manufactured, used and licensed by or for the U.S. Government for U.S. Government purposes.

BACKGROUND OF THE INVENTION

The invention relates in general to munitions and in particular to countermeasures for rocket propelled grenades (RPG).

Rocket propelled grenades, used by enemy forces, pose a serious threat to U.S. military vehicles and personnel. Heavily armored vehicles, such as the Abrams tank and the Bradley Fighting Vehicle, are equipped with advanced armors to defeat the RPG's shaped charge warhead. Most other military vehicles, however, cannot survive a direct hit from an RPG.

An existing approach to defeating RPG's approaching these other vehicles requires adding bulky special armor packages to the exterior of the vehicle. This additional armor is heavy and voluminous and consequently limits the transportability and maneuverability of the protected vehicle. Also, such armor engages the incoming RPG very close to the exterior of the vehicle where the RPG may still cause significant damage to the vehicle, its' occupants, and adjacent personnel.

Another existing approach to defeating incoming RPG's involves the use of an active protection system (APS) with explosive counter munitions. The main disadvantages of such a system are the precise timing required for achieving a successful intercept, and the possibility of the explosive counter munitions causing damage to the protected vehicle and personnel. The present invention provides a simple countermeasure to defeat incoming RPG's that overcomes the drawbacks of existing systems.

The invention will be better understood, and further objects, features, and advantages thereof will become more apparent from the following description of the preferred embodiments, taken in conjunction with the accompanying drawings.

BRIEF DESCRIPTIONS OF THE DRAWINGS

In the drawings, which are not necessarily to scale, like or corresponding parts are denoted by like or corresponding reference numerals.

FIG. 1 is a schematic drawing of the invention.

FIGS. 2A–F are schematic side views of a launch tube showing the progression from ignition to full deployment.

DETAILED DESCRIPTION OF THE PREFERRED EMBODIMENTS

A purpose of the present invention is to damage, disturb or cause premature detonation of an incoming RPG by deploying a parachute into its flight path. An array of launchers (similar to the M6 discharger found on U.S. combat vehicles), pointing in different directions, are affixed to an object to be protected. The object to be protected may be a vehicle or a stationary structure such as a building. The invention uses a known apparatus for tracking the incoming RPG. Such apparatus are capable of tracking incoming projectiles using radar and determining the incoming projectile's velocity and flight path direction. This information is then used by a firing solution computer to calculate the optimum time to launch the countermeasure and to determine from which tube it should be launched.

FIG. 1 is a schematic drawing of the invention. An object 10 to be protected may be a vehicle or a stationary structure such as a building. Mounted on the object 10 is a tracking apparatus 12. Tracking apparatus 12 can track an incoming RPG using a radar and determine the RPG's velocity and flight path direction. Examples of a tracking apparatus 12 include the Russian made DROZD and ARENA and the U.S. made FCLAS. Tracking apparatus 12 is connected to a firing solution computer 14. Firing solution computer 14 determines the proper time to launch the countermeasure and the appropriate launch tube. Firing solution computer 14 is connected to a plurality of launch tubes 16. Launch tubes 16 are mounted on the object 10 and are pointed in different directions to maximize coverage of the area surrounding the object 10. Mounted on each launch tube 16 is a parachute container 18.

FIGS. 2A–F are schematic side views of a launch tube 16 showing the progression from ignition to full deployment. Each launch tube 16 is preloaded with a mass 20, a propelling charge 22 and an igniter 24. Mass 20 may be made of, for example, steel, aluminum, etc, and has a weight in the range of, for example, two pounds to five pounds. Each igniter 24 is connected to the firing solution computer 14. An obturating band 26 is used to seal the propellant gases. Located on the forward end of the mass 20 is a connecting ring 28. A parachute 30 is stored in each parachute container 18. Parachute 30 may be made of, for example, Nylon or Kevlar and has an open diameter in the range of, for example, two feet to twenty feet. The parachute may be reinforced with a mesh of high strength lines or cables, for example, Kevlar or wire rope. Parachute container 18 is mounted on the external surface of each launch tube 16. One end of a cable 32 is attached to a connecting ring 28 on the forward end of the mass 20. The other end of the cable 32 is attached to the parachute 30.

When an incoming munition such as an RPG is detected by the tracking apparatus 12, the firing solution computer 14 determines the time of launch and the particular launch tube 16 and sends a firing signal to the igniter 24 of the appropriate launch tube 16. The igniter 24 initiates the propelling charge 22. As the propelling charge 22 burns, expanding gases 40 (FIG. 2B) that are sealed behind the obturator 26 push the mass 20 up the tube 16. The mass 20 continually accelerates in the direction of the arrow V until the obturator 26 exits the end of the tube 16. Soon after the mass 20 exits the tube 16, the cable 32 will be pulled taut. As the force acting on the cable 32 increases, the parachute 30 will be pulled from its storage container 18.

Figure 2A:
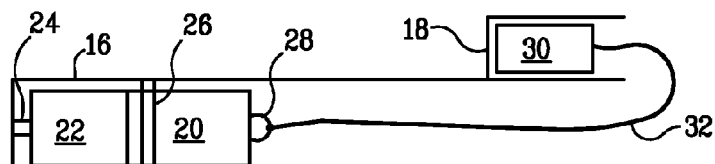
Figure 2B:
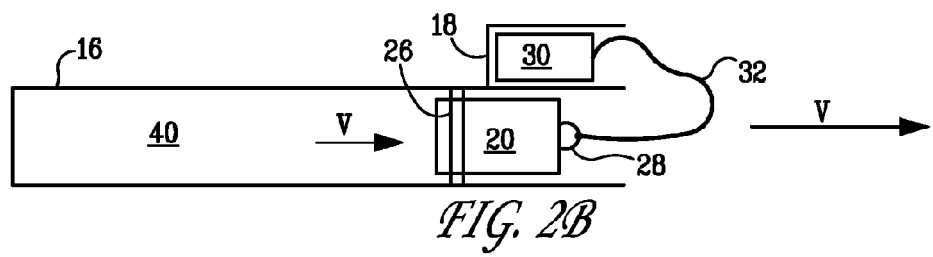
Figure 2C:
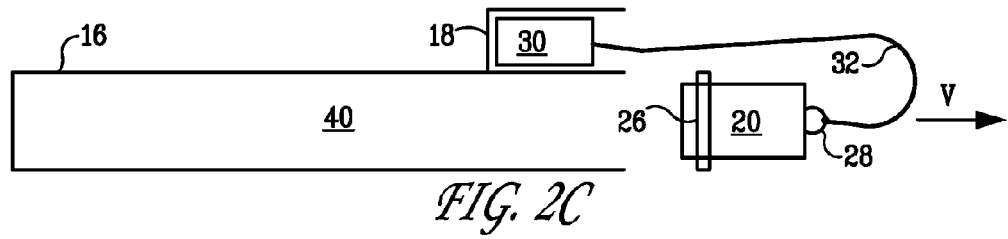
Figure 2D:
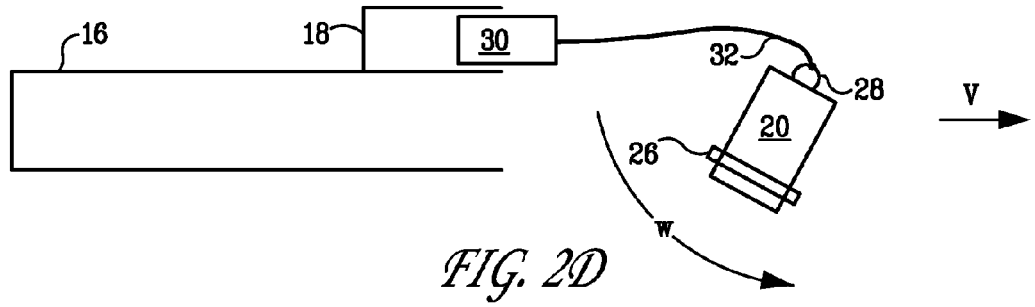
Figure 2E:
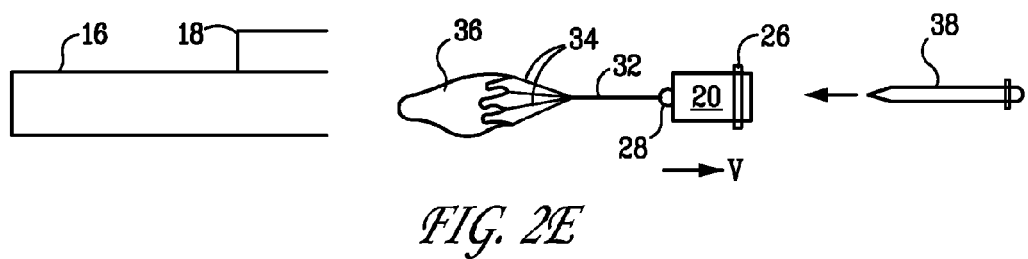
Figure 2F:
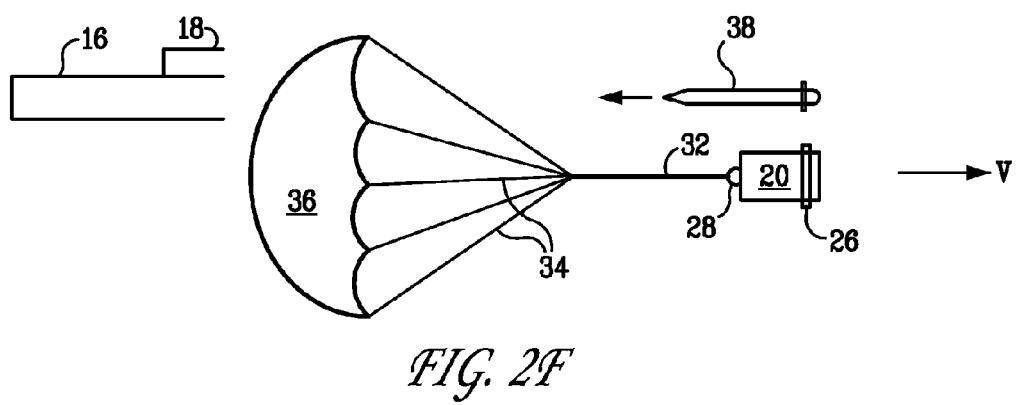

Simultaneously, the resultant force acting on the connecting ring 28 will cause the mass 20 to rapidly rotate as shown by the arrow w in FIG. 2D until the connecting ring 28 is facing rearward. As the mass 20 continues to fly forward, the parachute lines 34 and canopy 36 will be pulled from the storage container 18. Within a short period of time the parachute 30 will be fully inflated and flying directly towards the incoming RPG 38. The parachute 30 will remain inflated for a long time relative to the incoming projectile's 38 remaining flight time to impact, thereby alleviating the need for precise timing and fuzing systems. There are several mechanisms by which the collision between the parachute 30 and RPG 38 will render the RPG 38 less effective.

A significant amount of the momentum of the parachute 30 and mass 20 (which is similar to the momentum of the incoming RPG 38) will be transferred to the RPG 38, thereby slowing it and possibly causing it to miss the intended target. Secondly, the collision will cause damage to the RPG 38 such as breaking fins or crushing the nose cone. Damage to the fins and disturbance upon impact will cause the RPG angle of attack to grow, thereby greatly reducing its terminal effectiveness. Crushing the nose cone can short the RPG fuzing system, rendering the warhead inoperable. The collision between the parachute 30 and RPG 38 will take place well away from the protected vehicle 10. If the collision causes the warhead to detonate prematurely it is much less likely to hit or damage the protected vehicle 10.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus for protecting an object from an incoming munition, comprising:
   a tracking apparatus mounted on the object, for tracking the incoming munition;
   a firing solution computer connected to the tracking apparatus;
   a plurality of launch tubes mounted on the object, the plurality of launch tubes pointing in different directions so as to maximize coverage of an area surrounding the object;
   a parachute container attached to each launch tube;
   an igniter disposed in a rear of each launch tube and connected to the firing solution computer;
   a propelling charge disposed in front of each igniter;
   a mass disposed in front of each propelling charge;
   a connecting ring attached to a front of each mass;
   a parachute disposed in the parachute container; and
   a cable connecting the connecting ring and the parachute.

2. The apparatus of claim 1 further comprising an obturator band disposed around each mass.

3. The apparatus of claim 1 wherein the mass has a weight in a range of about two pounds to about five pounds.

4. The apparatus of claim 1 wherein the parachute has an open diameter in a range of about two feet to about twenty feet.

5. An apparatus for protecting an object from an incoming munition, comprising:
   a plurality of launch tubes mounted on the object, the plurality of launch tubes pointing in different directions so as to maximize coverage of an area surrounding the object;
   a parachute container attached to each launch tube;
   an igniter disposed in a rear of each launch tube;
   a propelling charge disposed in front of each igniter;
   a mass disposed in front of each propelling charge;
   a connecting ring attached to a front of each mass;
   a parachute disposed in the parachute container; and
   a cable connecting the connecting ring and the parachute.

6. The apparatus of claim 5 further comprising an obturator band disposed around each mass.

7. The apparatus of claim 5 wherein the mass has a weight in a range of about two pounds to about five pounds.

8. The apparatus of claim 5 wherein the parachute has an open diameter in a range of about two feet to about twenty feet.

9. A countermeasure for protecting an object from an incoming munition, comprising:
   a launch tube mounted on the object;
   a parachute container attached to the launch tube;
   an igniter disposed in a rear of said launch tube;
   a propelling charge disposed in front of the igniter;
   a mass disposed in front of the propelling charge;
   a connecting ring attached to a front of the mass;
   a parachute disposed in the parachute container; and
   a cable connecting the connecting ring and the parachute.

10. The apparatus of claim 9 further comprising an obturator band disposed around the mass.

11. The apparatus of claim 9 wherein the mass has a weight in a range of about two pounds to about five pounds.

12. The apparatus of claim 9 wherein the parachute has an open diameter in a range of about two feet to about twenty feet.

* * * * *